United States Patent
Lee et al.

(10) Patent No.: US 8,959,234 B2
(45) Date of Patent: Feb. 17, 2015

(54) METHOD AND SYSTEM FOR PROVIDING ONLINE SERVICES CORRESPONDING TO MULTIPLE MOBILE DEVICES, SERVER, MOBILE DEVICE, AND COMPUTER PROGRAM PRODUCT

(75) Inventors: Po-Yen Lee, Taoyuan County (TW); Chien-Wen Chen, Taoyuan County (TW); Pai-Chang Yeh, Taoyuan County (TW); Li-Wen Lian, Taoyuan County (TW)

(73) Assignee: HTC Corporation, Taoyuan County (TW)

(*) Notice: Subject to any disclaimer, the term of this patent is extended or adjusted under 35 U.S.C. 154(b) by 107 days.

(21) Appl. No.: 13/087,378

(22) Filed: Apr. 15, 2011

(65) Prior Publication Data
US 2011/0258329 A1 Oct. 20, 2011

Related U.S. Application Data (60) Provisional application No. 61/324,303, filed on Apr. 15, 2010.

(51) Int. Cl.
G06F 15/16 (2006.01)
G06F 21/41 (2013.01)
H04W 56/00 (2009.01)
(Continued)

(52) U.S. Cl.
CPC ............ *G06F 21/41* (2013.01); *H04W 56/001* (2013.01); *H04W 76/025* (2013.01); *H04L 63/0815* (2013.01); *H04L 67/125* (2013.01);
(Continued)

(58) Field of Classification Search
USPC ......... 709/203, 223, 227, 230, 217, 226, 229, 709/248; 726/3, 5, 7
See application file for complete search history.

(56) References Cited

U.S. PATENT DOCUMENTS 7,668,195 B2 * 2/2010 Stone ............................ 370/465
8,185,127 B1 * 5/2012 Cai et al. ...................... 455/405
(Continued)

FOREIGN PATENT DOCUMENTS

CN 101588344 11/2009
TW I315478 10/2009

OTHER PUBLICATIONS

"Office Action of Europe Counterpart Application", issued on Aug. 10, 2012, p. 1-p. 7.
(Continued)

*Primary Examiner* — Ramy M Osman
(74) *Attorney, Agent, or Firm* — Jianq Chyun IP Office (57) ABSTRACT

A method and a system for providing online services corresponding to multiple mobile devices, a server, a mobile device, and a computer program product are provided. The server provides a service website. In the present method, a login request of a user account of the service website is received from a terminal device. A first connection with a first mobile device of the user account is established, and a first device data of the first mobile device is obtained. A second connection with a second mobile device of the user account is established while maintaining the first connection, and a second device data of the second mobile device is obtained. A first online service corresponding to the first mobile device and a second online service corresponding to the second mobile device are provided on the service website according to the first device data and the second device data.

20 Claims, 4 Drawing Sheets

(51) Int. Cl.
*H04W 76/02* (2009.01)
*H04L 29/06* (2006.01)
*H04L 29/08* (2006.01)
*G06Q 10/10* (2012.01)
*H04W 12/06* (2009.01)

(52) U.S. Cl.
CPC ............. *G06Q 10/10* (2013.01); *H04W 12/06* (2013.01); *H04L 67/02* (2013.01); *H04L 69/14* (2013.01)
USPC ............ 709/227; 709/203; 709/229; 709/248

(56) References Cited

U.S. PATENT DOCUMENTS

| | | | |
|---|---|---|---|
| 2002/0103935 A1 | 8/2002 | Fishman et al. | |
| 2002/0184351 A1* | 12/2002 | Istvan et al. | 709/222 |
| 2003/0054810 A1* | 3/2003 | Chen et al. | 455/422 |
| 2003/0224760 A1 | 12/2003 | Day | |
| 2005/0091539 A1* | 4/2005 | Wang et al. | 713/201 |
| 2006/0217113 A1* | 9/2006 | Rao et al. | 455/422.1 |
| 2008/0043696 A1* | 2/2008 | Yang et al. | 370/341 |
| 2008/0216153 A1* | 9/2008 | Aaltonen et al. | 726/3 |
| 2008/0263648 A1* | 10/2008 | Sathyan et al. | 726/7 |
| 2011/0083169 A1* | 4/2011 | Moeller et al. | 726/5 |

OTHER PUBLICATIONS

"Search Report of Europe Counterpart Application", issued on Sep. 13, 2011, p. 1-p. 3.

D'Souza, "Remote sign out and info to help you protect your Gmail account", Official Gmail Blog, Jul. 7, 2008, Available at: http://gmailblog.blogspot.tw/2008/07/remote-sign-out-and-info-to-help-you.html.

"Office Action of Europe Counterpart Application", issued on Feb. 5, 2013, p. 1-p. 8.

"Office Action of China Counterpart Application", issued on Jul. 24, 2013, p. 1-p. 6.

"Office Action of Taiwan Counterpart Application", issued on Nov. 19, 2013, p. 1-p. 6.

\* cited by examiner

METHOD AND SYSTEM FOR PROVIDING ONLINE SERVICES CORRESPONDING TO MULTIPLE MOBILE DEVICES, SERVER, MOBILE DEVICE, AND COMPUTER PROGRAM PRODUCT

BACKGROUND OF THE INVENTION

1. Field of the Invention

The invention generally relates to a method for providing online services, and more particularly, to a method and a system for providing online services corresponding to multiple mobile devices, a server, a mobile device, and a computer program product.

2. Description of Related Art

Along with the advancement of mobile technology, mobile communication devices have become one of the most indispensable tools in our daily life. A user may even possess more than one mobile communication device in order to deal with different situations. However, it may be very inconvenient to such a user to use an online service provided by the manufacturer of a mobile communication device.

To be specific, before using the online service, the user needs to register with the service provider and logs in with his/her user account from a device. After that, the user can use the online service from another remote device. However, an existing online service system allows a user account to log in from only one device at one time. In other words, if a user has logged in with his/her user account from a first mobile communication device, when the user logs in with the same user account from a second mobile communication device, the user account automatically logs off from the first mobile communication device to terminate the connection with the server.

Accordingly, when only one user account is registered, a user cannot log into different mobile communication devices by using the single user account. As a result, the user cannot remotely control multiple mobile communication devices at the same time through an online service, which is very inconvenient to the user.

SUMMARY OF THE INVENTION

Accordingly, the invention is directed to a method and a system for providing online services corresponding to multiple mobile devices, a server, a mobile device, and a computer program product, wherein a user account of the online services can log in from multiple mobile devices.

The invention provides a method for providing online services corresponding to multiple mobile devices. The method is adapted to a server that provides a service website. In the present method, a login request of a user account of the service website from a terminal device is accepted. A first connection with a first mobile device of the user account is established, and a first device data of the first mobile device is obtained. A second connection with a second mobile device of the user account is established while maintaining the first connection, and a second device data of the second mobile device is obtained. A first online service corresponding to the first mobile device and a second online service corresponding to the second mobile device are provided on the service website according to the first device data and the second device data.

The invention provides a system for providing online services corresponding to multiple mobile devices. The system includes a first mobile device, a second mobile device, and a server. The server includes a storage unit and a service provider module that are coupled with each other. The service provider module provides a service website. The storage unit stores a user account of the service website. The first mobile device and the second mobile device are set up with the same user account. The service provider module of the server accepts a login request of the user account of the service website from a terminal device, establishes a first connection with the first mobile device, obtains a first device data of the first mobile device, and stores the first device data into the storage unit. The service provider module of the server also establishes a second connection with the second mobile device while maintaining the first connection, obtains a second device data of the second mobile device, and stores the second device data into the storage unit. The service provider module provides a first online service corresponding to the first mobile device and a second online service corresponding to the second mobile device on the service website according to the first device data and the second device data.

The invention provides a server including a storage unit and a service provider module that are coupled with each other. The service provider module provides a service website. The storage unit stores a user account of the service website. The service provider module accepts a login request of the user account of the service website from a terminal device, establishes a first connection with a first mobile device of the user account, obtains a first device data of the first mobile device, and stores the first device data into the storage unit. The service provider module also establishes a second connection with a second mobile device of the user account while maintaining the first connection, obtains a second device data of the second mobile device, and stores the second device data into the storage unit. The service provider module provides a first online service corresponding to the first mobile device and a second online service corresponding to the second mobile device on the service website according to the first device data and the second device data.

The invention provides a mobile device including a wireless communication module and a processing module that are coupled with each other. After setting up a user account in the mobile device, the processing module establishes a connection with a server that provides a service website through the wireless communication module and sends a first device data of the mobile device to the server. The server also connects to a second mobile device that is already set up with the user account and obtains a second device data of the second mobile device. After receiving a login request of the user account from a terminal device, the server provides a first online service corresponding to the mobile device and a second online service corresponding to the second mobile device on the service website according to the first device data and the second device data.

The invention provides a computer program product including a plurality of program instructions, wherein the program instructions are suitable for being loaded into a server that provides a service website. The program instructions execute following steps after being loaded into the server. A login request of a user account of the service website from a terminal device is accepted. A first connection with a first mobile device of the user account is established, and a first device data of the first mobile device is obtained. A second connection with a second mobile device of the user account is established while maintaining the first connection, and a second device data of the second mobile device is obtained. A first online service corresponding to the first mobile device and a second online service corresponding to the second mobile device are provided on the service website according to the first device data and the second device data.

As described above, in the invention, a user is allowed to log in by using a same user account from multiple mobile devices, so as to keep the mobile devices connected with a server. Accordingly, the user may use online services corresponding to the mobile devices when the user logs into a service website provided by the server by using the user account from a terminal device. Namely, the user is allowed to remotely control the mobile devices from the terminal device. Thereby, it is made very convenient to a user to use online services when the user possesses multiple mobile devices.

BRIEF DESCRIPTION OF THE DRAWINGS

The accompanying drawings are included to provide a further understanding of the invention, and are incorporated in and constitute a part of this specification. The drawings illustrate examples of the invention and, together with the description, serve to explain the principles of the invention.

DETAILED DESCRIPTION EXAMPLE

Reference will now be made in detail to the present preferred examples of the invention, examples of which are illustrated in the accompanying drawings. Wherever possible, the same reference numbers are used in the drawings and the description to refer to the same or like parts.

Figure 1:
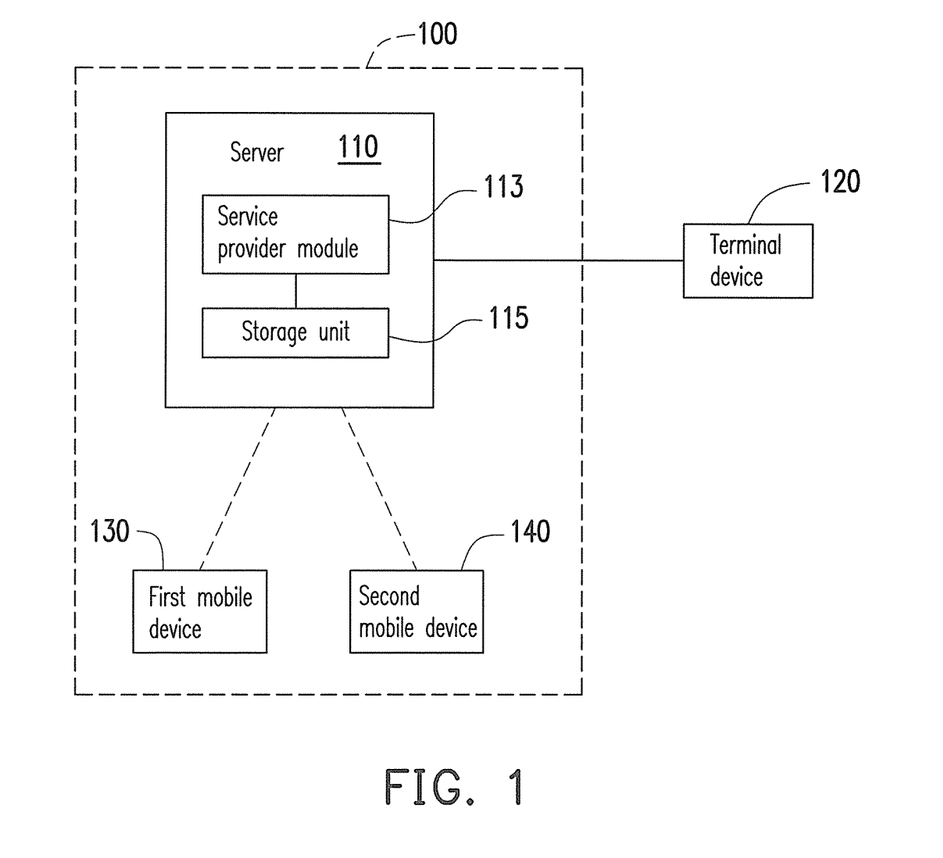
FIG. 1 is a diagram of a system for providing online services corresponding to multiple mobile devices according to an example of the invention.

FIG. 1 is a diagram of a system for providing online services corresponding to multiple mobile devices according to an example of the invention. Referring to FIG. 1, the online service providing system 100 includes a server 110, a first mobile device 130, and a second mobile device 140. In the present example, the server 110 provides a service website and provides online services corresponding to the mobile devices to a terminal device 120 through the service website. It should be noted that the online services provided by the server 110 are corresponding to multiple mobile devices. Namely, a user may remotely control more than one mobile device on the terminal device 120 through the service website. The terminal device 120 may be a desktop computer, a laptop computer, or any other mobile device different from the first mobile device 130 and the second mobile device 140. However, the type of the terminal device 120 is not limited herein.

As shown in FIG. 1, the server 110 includes a service provider module 113 and a storage unit 115 that are coupled with each other. The service provider module 113 provides the service website and performs operations related to the online services. In the present example, the service provider module 113 may be any functional module implemented as a hardware and/or software. Herein the hardware may be a central processing unit (CPU), a chipset, a microprocessor, a controller, an application specific integrated circuit (ASIC), a programmable logic device (PLD), a control circuit, or a combination of aforementioned devices. The software may be an operating system (OS), a driver program, or an application program (AP). The storage unit 115 stores a user account registered through the service website.

Figure 2:
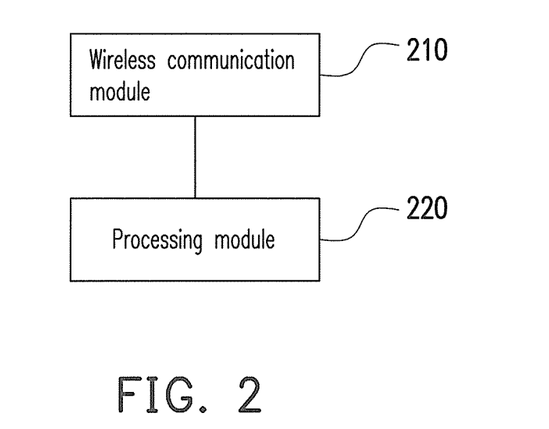
FIG. 2 is a block diagram of a mobile device according to an example of the invention.

The first mobile device 130 and the second mobile device 140 may be cell phones, smart phones, personal digital assistants (PDAs), or PDA phones. However, the type of the first mobile device 130 and the second mobile device 140 is not limited herein. FIG. 2 is a block diagram of the first mobile device 130 and the second mobile device 140. Each of the first mobile device 130 and the second mobile device 140 includes a wireless communication module 210 and a processing module 220 that are coupled with each other. The wireless communication module 210 may be one or a combination of a Third Generation Telecommunication (3G) module, a Wireless Fidelity (Wi-Fi) module, a Worldwide Interoperability for Microwave Access (WiMAX) module, and a General Packet Radio Service (GPRS) module. The processing module 220 may be a CPU, a microprocessor, a controller, an ASIC, a PLD, or any other similar device, or a combination of aforementioned devices. The processing module 220 may also be an OS, a driver program, an AP, or a combination of aforementioned hardware devices and software. The processing module 220 sets up user accounts in mobile devices in response to user operations and controls the wireless communication module 210 to send device data of the mobile devices to the server 110 when it receives special instructions from the server 110.

In the online service providing system 100, a user can set up the same authenticated user account in the first mobile device 130 and the second mobile device 140. When the user logs into the service website provided by the server 110 on a terminal device 120 by using the user account, the user may use online services corresponding to the first mobile device 130 and the second mobile device 140 on the terminal device 120. Below, the operation of the online service providing system 100 will be explained in detail with reference to both FIG. 1 and FIG. 3.

Figure 3:
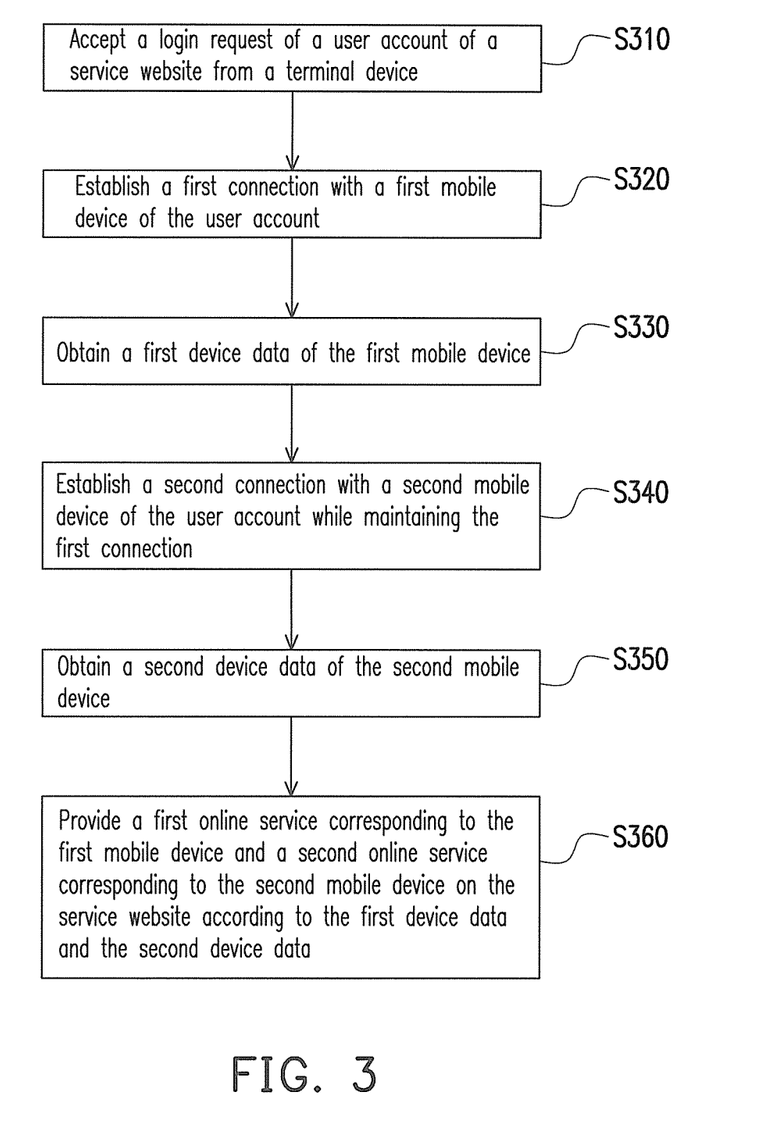
FIG. 3 is a flowchart of a method for providing online services corresponding to multiple mobile devices according to an example of the invention.

First, in step S310, the service provider module 113 of the server 110 accepts a login request of a user account of the service website from the terminal device 120. To be specific, when the user tries to log into the service website on the terminal device 120 by using a user account, the service provider module 113 first determines whether the user account is stored in the storage unit 115, then verifies the user account and password input by the user, and accepts the login request from the terminal device 120 after the identify of the user is confirmed.

In step S320, the service provider module 113 establishes a first connection between the server 110 and the first mobile device 130 of the user account. In step S330, the service provider module 113 obtains a first device data of the first mobile device 130 and stores the first device data into the storage unit 115. Besides, in step S340, the service provider module 113 establishes a second connection between the server 110 and the second mobile device 140 of the user account while maintaining the first connection. In step S350, the service provider module 113 obtains the second device data of the second mobile device 140 and stores the second device data into the storage unit 115. The first device data and the second device data may contain only device identification data or both device identification data and device usage data. Herein the device identification data includes one or both of an international mobile equipment identity (IMEI) and a mobile device serial number. The device usage data may be different data generated when the mobile device is in operation, such as contact information, short messages, call history, multimedia files, or setting values.

In step S360, the service provider module 113 provides a first online service corresponding to the first mobile device 130 and a second online service corresponding to the second mobile device 140 on the service website according to the first device data and the second device data. Accordingly, the user may remotely control the first mobile device 130 and/or the second mobile device 140 through the service website on the terminal device 120.

Below, how the service provider module 113 provides online services corresponding to multiple mobile devices on the service website according to device data of different mobile devices will be explained in detail with reference to FIGS. 4-7.

Figure 4:
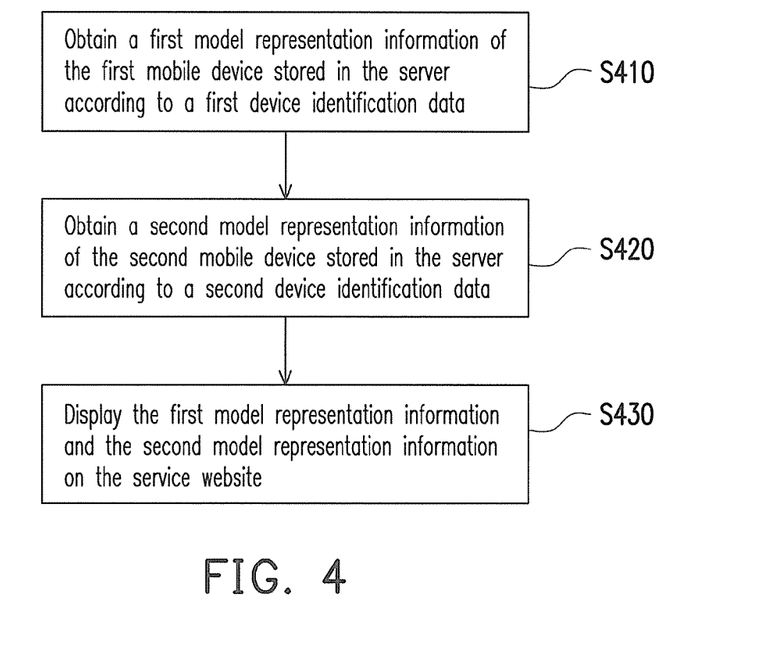
FIG. 4 is a flowchart of providing online services corresponding to multiple mobile devices on a service website according to device data according to an example of the invention.

In an example, the first device data and the second device data received from the first mobile device 130 and the second mobile device 140 are both device identification data (respectively referred to as a first device identification data and a second device identification data thereinafter). Besides, a model information is pre-stored in the storage unit 115 of the server 110, wherein the model information contains at least one device identification data and the model representation information (for example, image or model name of mobile devices of a model) corresponding to each device identification data.

Because each mobile device has a unique device identification data, in step S410 of FIG. 4, the service provider module 113 compares the first device identification data with the model information in the storage unit 115 to obtain the first model representation information of the first mobile device 130 from the storage unit 115 according to the first device identification data. Similarly, in step S420, the service provider module 113 obtains the second model representation information of the second mobile device 140 from the storage unit 115 according to the second device identification data. Next, in step S430, the service provider module 113 displays the first model representation information of the first mobile device 130 and the second model representation information of the second mobile device 140 on the service website.

Assuming that the model representation information is the appearance image of a mobile device, through the steps illustrated in FIG. 4, the appearance images of the first mobile device 130 and the second mobile device 140 are displayed on the service website so that the user may view all the mobile devices currently connected to the server 110 on the service website by using a browser on the terminal device 120.

Figure 5:
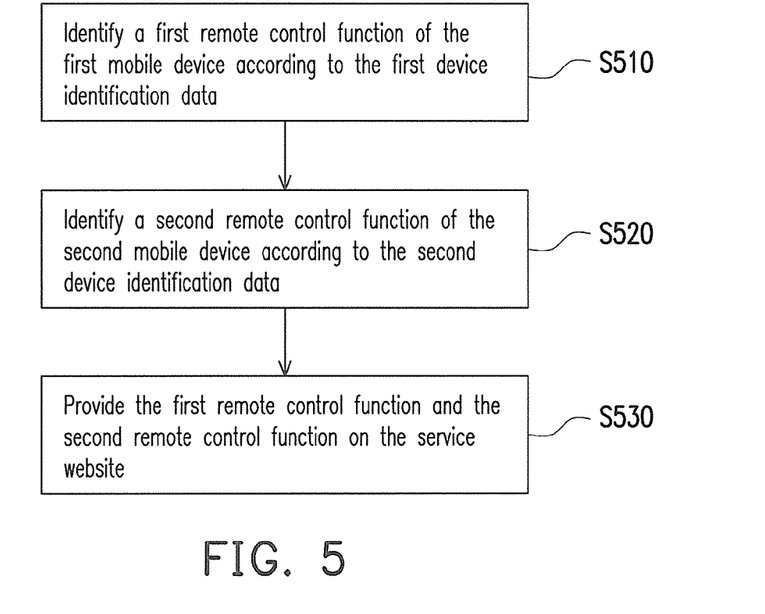
FIG. 5 is a flowchart of providing online services corresponding to multiple mobile devices on a service website according to device data according to another example of the invention.

In another example, the first device data and the second device data respectively corresponding to the first mobile device 130 and the second mobile device 140 are device identification data (respectively referred to as a first device identification data and a second device identification data thereinafter). Besides, a remote function information is pre-stored in the storage unit 115 of the server 110, wherein the remote function information contains at least one device identification data and one or more remote control functions corresponding to each device identification data.

As shown in FIG. 5, in step S510, the service provider module 113 compares the first device identification data with the remote function information in the storage unit 115 to identify the first remote control function supported by the first mobile device 130 according to the first device identification data. In step S520, the service provider module 113 compares the second device identification data with the remote function information in the storage unit 115 to identify the second remote control function of the second mobile device 140 according to the second device identification data. In the present example, the first remote control function and the second remote control function respectively include one or more different functions. After that, in step S530, the service provider module 113 provides the first remote control function and the second remote control function on the service website.

Through the steps illustrated in FIG. 5, the service provider module 113 displays options of the mobile devices on the service website such that the user may choose to remotely control the first mobile device 130 and/or the second mobile device 140 on the service website. The service provider module 113 also lists all the remote control functions supported by each mobile device on the service website to allow the user to select the desired function through the service website.

Assuming that the first mobile device 130 has several remote control functions and the user chooses to remotely control the first mobile device 130 and selects a specific remote control function (for example, for playing a ringtone with the highest volume) supported by the first mobile device 130 on the service website, after the service provider module 113 receives the remote control request, it sends a corresponding remote control instruction to the first mobile device 130 to control the first mobile device 130 to play the ringtone with the highest volume. Subsequently, when the user wants to remotely control the second mobile device 140, he/she can switch the remote control target from the first mobile device 130 to the second mobile device 140 and selects one of the remote control functions of the second mobile device 140 through the service website. After the service provider module 113 receives the new remote control request, it sends the corresponding remote control instruction to the second mobile device 140 to control the second mobile device 140 to execute corresponding operations.

In another example, the user may also choose to remotely control both the first mobile device 130 and the second mobile device 140 on the service website. In this case, the service provider module 113 sends corresponding remote control instructions to the first mobile device 130 and the second mobile device 140 to allow the user to remotely control both mobile devices.

In following example, it is assumed that the first device data and the second device data sent by the first mobile device 130 and the second mobile device 140 to the server 110 contains device identification data and device usage data. Because each mobile device has a unique device identification data, after receiving the first device data from the first mobile device 130, the service provider module 113 establishes a database in the storage unit 115 for storing the first device usage data of the first mobile device 130 by using the first device identification data of the first mobile device 130 as a index key and mark user accounts corresponding to the first mobile device 130. When the service provider module 113 receives the second device data from the second mobile device 140, it stores the second device data in the storage unit 115 in a similar way. Namely, in the present example, the service provider module 113 establishes a plurality of databases in the storage unit 115 to respectively record the device data of mobile devices connected to the server 110.

In the present example, the service provider module 113 displays options on the service website such that a user may choose the mobile device (all or a part of the mobile devices connected to the server 110) to remotely view the device usage data thereof. After the user makes his/her selection through the terminal device 120, in step S610 of FIG. 6, the service provider module 113 receives a data display request of the user account from the terminal device 120, wherein the data display request is corresponding to a device usage data in the first device usage data and the second device usage data. Then, in step S620, the service provider module 113 identifies the mobile device to be viewed by the user according to the data display request, obtains the corresponding device usage data from the storage unit 115, and displays the device usage data on the service website.

Figure 6:
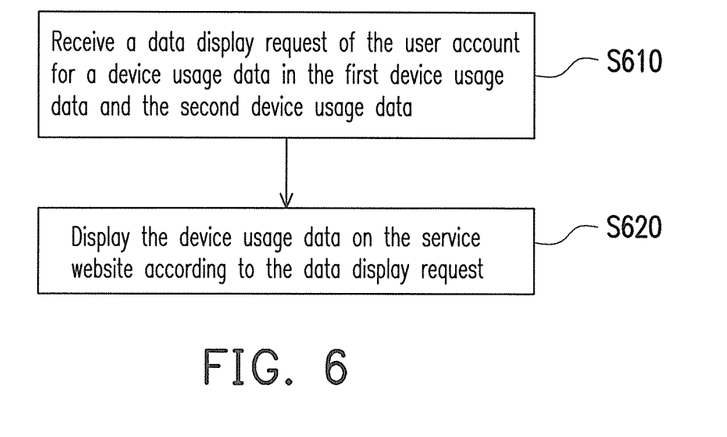
FIG. 6 is a flowchart of providing online services corresponding to multiple mobile devices on a service website according to device data according to another example of the invention.

For example, when the user chooses to view the first mobile device 130 among all the mobile devices connected to the server 110, the data display request generated by the service website is corresponding to the first device identification data of the first mobile device 130. After the service provider module 113 receives the data display request, it compares the first device identification data with the index key in each database in the storage unit 115 to obtain the first device usage data of the first mobile device 130 from the storage unit 115 and display the first device usage data on the service website.

In another example, the service provider module 113 displays options on the service website to allow the user to select one or more mobile devices to be remotely accessed among all the mobile devices connected to the server 110 and configure the desired data access operations. After that, the server 110 receives a data access request corresponding to the user selection and configuration through the service website. To be specific, in step S710 of FIG. 7, the service provider module 113 receives a data access request of the user account for a device usage data. In the present example, the data access request contains the device identification data of the mobile device to be accessed by the user.

Figure 7:
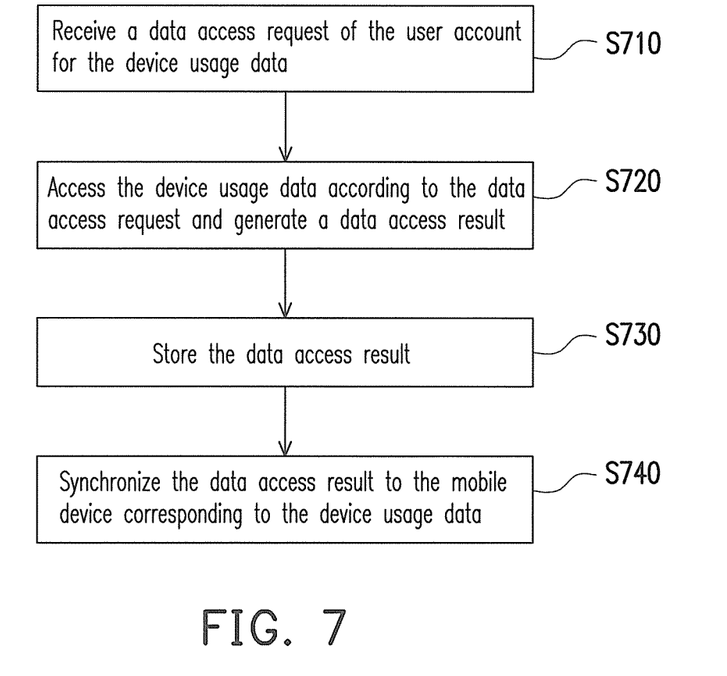
FIG. 7 is a flowchart of providing online services corresponding to multiple mobile devices on a service website according to device data according to another example of the invention.

Then, in step S720, the service provider module 113 accesses the device usage data according to the data access request and generates a data access result. To be specific, the service provider module 113 identifies the device identification data in the data access request and obtains the device usage data of the corresponding mobile device from the storage unit 115 according to the data access request. After that, the service provider module 113 accesses the device usage data to generate the data access result.

Next, in step S730, the service provider module 113 stores the data access result into the storage unit 115. In step S740, the service provider module 113 synchronizes the data access result to the mobile device corresponding to the device usage data according to the device identification data.

For example, after the user selects the first mobile device 130 through the service website, the service provider module 113 obtains the first device usage data of the first mobile device 130 from the storage unit 115 and displays the first device usage data on the service website. Thereafter, the user may remotely perform various access operations on the first device usage data through the service website. The service provider module 113 updates the database corresponding to the first mobile device 130 in the storage unit 115 by using the data access results generated by the access operations and synchronizes the data access results to the first mobile device 130.

Additionally, the user may also switch the remote data access target through the service website. As in the example described above, if subsequently the user selects the second mobile device 140 on the service website, the service provider module 113 changes the content of the service website to display the second device usage data of the second mobile device 140 on the service website, so that the user may remotely access the second device usage data through the service website. Similarly, the service provider module 113 updates the database corresponding to the second mobile device 140 in the storage unit 115 by using the generated data access result and synchronizes the data access result to the second mobile device 140.

The user may also choose to remotely access the device usage data of both the first mobile device 130 and the second mobile device 140 on the service website. In this case, the service provider module 113 performs access operations according to the user's instructions, updates the databases respectively corresponding to the first mobile device 130 and the second mobile device 140 in the storage unit 115 by using the generated data access results, and synchronizes the data access results to the first mobile device 130 and the second mobile device 140.

In another example, the user may also terminate the connection between a mobile device and the server 110 through the service website. For example, if the user choose to terminate the connection between the first mobile device 130 and the server 110 on the service website by using the terminal device 120, after the service provider module 113 receives the termination request generated by the service website, it deletes the first device usage data corresponding to the first mobile device 130 from the storage unit 115.

The invention further provides a computer program product. The computer program product is composed of a plurality of program instructions. The method described above for providing online services corresponding to multiple mobile devices and the server functions described in foregoing examples can be accomplished when these program instructions are loaded into a server and executed by the same. The computer program product may be stored in any data storage device (for example, a read-only memory, a random access memory, a magnetic tape, a floppy disk, a hard disk, a CD-ROM, or a transmission medium) or directly provided through a network. However, how the computer program product is stored or provided is not limited herein.

In summary, the invention provides a method and a system for providing online services corresponding to multiple mobile devices, a server, a mobile device, and a computer program product, wherein a user is allowed to log in by using a same user account from multiple mobile devices, so as to keep the mobile devices connected with the server. Accordingly, after the user logs into a service website by using the same user account on a terminal device, the user may remotely control all or some of the mobile devices connected to the server by using the terminal device. Thereby, a user possessing more than one mobile device may conveniently use online services corresponding to these mobile devices by using a single user account.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method of providing online services for multiple mobile devices under a single user account through a wireless network, for use by a server which provides a service website, and the method comprising:
   accepting a login request of a user account of the service website from a terminal device;
   establishing a first connection with a first mobile device of the user account in response to verifying the user account;
   obtaining a first device identification data of the first mobile device through the first connection;
   obtaining a second device identification data of a second mobile device;
   establishing a second connection with the second mobile device of the same user account while maintaining the first connection by associating the first device identification data and the second device identification data with the user account, wherein each of the first device identification data and the second device identification data are unique physical identification data;
   providing a first online service corresponding to the first mobile device and a second online service corresponding to the second mobile device on the service website according to the first device identification data and the second device identification data;
   receiving a data access request of the same user account for data and synchronizing the data with the first mobile device through the first online service using the same user account and synchronizing the data with the second mobile device through the second online service using the same user account while maintaining both the first connection and the second connection using the same user account; and
   performing remote access of the first mobile device and the second mobile device on the service website by using the terminal device.

2. The method according to claim 1, wherein the step of providing the first online service and the second online service on the service website according to the first device identification data and the second device identification data comprises:
   obtaining a first model representation information of the first mobile device stored in the server according to the first device identification data;
   obtaining a second model representation information of the second mobile device stored in the server according to the second device identification data; and
   displaying the first model representation information and the second model representation information on the service website.

3. The method according to claim 2, wherein the first device identification data and the second device identification data respectively comprise at least one of an international mobile equipment identity (IMEI) and a mobile device serial number.

4. The method according to claim 1, wherein the step of providing the first online service and the second online service on the service website according to the first device identification data and the second device identification data comprises:
   identifying a first remote control function of the first mobile device according to the first device identification data;
   identifying a second remote control function of the second mobile device according to the second device identification data; and
   providing the first remote control function and the second remote control function on the service website.

5. The method according to claim 1, wherein the first device identification data further comprises a first device usage data, the second device identification data further comprises a second device usage data, and the step of providing the first online service and the second online service on the service website according to the first device identification data and the second device identification data comprises:
   receiving a data display request of the user account from the terminal device for a device usage data in the first device usage data and the second device usage data; and
   displaying the device usage data on the service website according to the data display request.

6. The method according to claim 5, wherein the step of providing the first online service and the second online service on the service website according to the first device data and the second device data further comprises:
   receiving a data access request of the user account for the device usage data;
   accessing the device usage data according to the data access request and generating a data access result;
   storing the data access result; and
   synchronizing the data access result to one of the first mobile device and the second mobile device that the device usage data is corresponding to.

7. A system for providing online services corresponding to multiple mobile devices, comprising:
   a server, comprising:
      a service provider module, for providing a service website; and
      a storage unit, coupled to the service provider module, for storing a user account of the service website;
   a first mobile device, already set up with the user account; and
   a second mobile device, already set up with the same user account,
   wherein the service provider module of the server accepts a login request of the user account of the service website from a terminal device, establishes a first wireless connection with the first mobile device of the user account in response to verifying the user account, obtains a first device identification data of the first mobile device through the first wireless connection, and stores the first device identification data into the storage unit, and the service provider module obtains a second device identification data of the second mobile device, and stores the second device identification data into the storage unit, and also establishes a second wireless connection with the second mobile device using the same user account as the first mobile device while maintaining the first connection by associating the first device identification data and the second device identification data with the user account, wherein each of the first device identification data and the second device identification data are unique physical identification data,
   the service provider module provides a first online service corresponding to the first mobile device and a second online service corresponding to the second mobile device on the service website according to the first device identification data and the second device identification data, receives a data access request of the same user account and synchronizes the data with the first mobile device through the first online service using the same user account and synchronizing the data with the second mobile device through the second online service using the same user account while maintaining both the first connection and the second connection using the same user account, and performs remote access of the first mobile device and the second mobile device on the service website by using the terminal device.

8. The system according to claim 7, wherein the storage unit of the server stores a first model representation information corresponding to the first device identification data and a second model representation information corresponding to the second device identification data,
the service provider module of the server obtains the first model representation information from the storage unit according to the first device identification data, obtains the second model representation information from the storage unit according to the second device identification data, and displays the first model representation information and the second model representation information on the service website.

9. The system according to claim 8, wherein the first device identification data and the second device identification data respectively comprise at least one of an IMEI and a mobile device serial number.

10. The system according to claim 7, wherein the storage unit of the server stores a first remote control function corresponding to the first device identification data and a second remote control function corresponding to the second device identification data,
the service provider module of the server identifies the first remote control function according to the first device identification data through the storage unit, identifies the second remote control function according to the second device identification data through the storage unit, and provides the first remote control function and the second remote control function on the service website.

11. The system according to claim 7, wherein the first device identification data further comprises a first device usage data, the second device identification data further comprises a second device usage data, and the service provider module of the server receives a data display request of the user account from the terminal device for a device usage data in the first device usage data and the second device usage data and displays the device usage data on the service website according to the data display request.

12. The system according to claim 11, wherein the service provider module receives a data access request of the user account for the device usage data, accesses the device usage data according to the data access request, generates a data access result, stores the data access result into the storage unit, and synchronizes the data access result to one of the first mobile device and the second mobile device that the device usage data is corresponding to.

13. A server, comprising:
a service provider module, for providing a service website; and
a storage unit, coupled to the service provider module, for storing a user account of the service website,
wherein the service provider module accepts a login request of the user account of the service website from a terminal device, establishes a first wireless connection with a first mobile device of the user account in response to verifying the user account, obtains a first device identification data of the first mobile device through the first wireless connection, stores the first device identification data into the storage unit, obtains a second device identification data of the second mobile device, and stores the second device identification data into the storage unit, and the service provider module also establishes a second wireless connection with a second mobile device of the same user account as the first mobile device while maintaining the first connection by associating the first device identification data and the second device identification data with the user account, wherein each of the first device identification data and the second device identification data are unique physical identification data,
the service provider module provides a first online service corresponding to the first mobile device and a second online service corresponding to the second mobile device on the service website according to the first device identification data and the second device identification data, receives a data access request of the same user account for data and synchronizes the data with the first mobile device through the first online service using the same user account and synchronizing the data with the second mobile device through the second online service using the same user account while maintaining both the first connection and the second connection using the same user account, and performs remote access of the first mobile device and the second mobile device on the service website by using the terminal device.

14. The server according to claim 13, wherein the storage unit stores a first model representation information corresponding to the first device identification data and a second model representation information corresponding to the second device identification data,
the service provider module obtains the first model representation information from the storage unit according to the first device identification data, obtains the second model representation information from the storage unit according to the second device identification data, and displays the first model representation information and the second model representation information on the service website.

15. The server according to claim 14, wherein the first device identification data and the second device identification data respectively comprise at least one of an IMEI and a mobile device serial number.

16. The server according to claim 13, wherein the storage unit stores a first remote control function corresponding to the first device identification data and a second remote control function corresponding to the second device identification data,
the service provider module identifies the first remote control function according to the first device identification data through the storage unit, identifies the second remote control function according to the second device identification data through the storage unit, and provides the first remote control function and the second remote control function on the service website.

17. The server according to claim 13, wherein the first device identification data further comprises a first device usage data, the second device identification data further comprises a second device usage data, and the service provider module receives a data display request of the user account from the terminal device for a device usage data in the first device usage data and the second device usage data and displays the device usage data on the service website according to the data display request.

18. The server according to claim 17, wherein the service provider module receives a data access request of the user account for the device usage data, accesses the device usage data according to the data access request, generates a data access result, stores the data access result into the storage unit, and synchronizes the data access result to one of the first mobile device and the second mobile device that the device usage data is corresponding to.

19. A non-transitory storage medium, comprising a plurality of program instructions loaded into a server which provides a service website, wherein the program instructions execute following steps after being loaded into the server:
  accepting a login request of a user account of the service website from a terminal device;
  establishing a first wireless connection with a first mobile device of the user account in response to verifying the user account;
  obtaining a first device identification data of the first mobile device through the first wireless connection;
  obtaining a second device identification data of a second mobile device;
  establishing a second connection with the second mobile device of the same user account through the second connection while maintaining the first connection by associating the first device identification data and the second device identification data with the user account, wherein each of the first device identification data and the second device identification data are unique physical identification data;
  providing a first online service corresponding to the first mobile device and a second online service corresponding to the second mobile device on the service website according to the first device identification data and the second device identification data;
  receiving a data access request of the same user account for data and synchronizing the data with the first mobile device through the first online service using the same user account and synchronizing the data with the second mobile device through the second online service using the same user account while maintaining both the first connection and the second connection using the same user account; and performs remote access of the first mobile device and the second mobile device on the service website by using the terminal device.

20. A mobile device, comprising:
  a wireless communication module; and
  a processing module, coupled to the wireless communication module and is configured for:
    after a login request from a terminal device by using a user account of a service website hosted by a server is accepted by the server, establishing a first connection with the server by using the same the user account;
  transmitting a first device identification data of the first mobile device through the first connection;
  after the server obtaining a second device identification data of a second mobile device and establishing a second connection with the second mobile device of the same user account while maintaining the first connection by associating the first device identification data and the second device identification data with the user account, wherein each of the first device identification data and the second device identification data are unique physical identification data, operating under a first online service from the server while the second mobile device operating under a second online service from the server on the service website according to the first device identification data and the second device identification data;
  receiving a data access request of the same user account for data and synchronizing the data with the server through the first online service using the same user account and synchronizing the data with the second mobile device through the second online service using the same user account while maintaining both the first connection and the second connection using the same user account; and
  receiving remote access from the terminal device operating through the service website.

* * * * *